Aug. 17, 1926.
H. SWOYER
1,596,635
ECCENTRIC CRANK FASTENING FOR LOCOMOTIVES
Filed Nov. 13, 1925
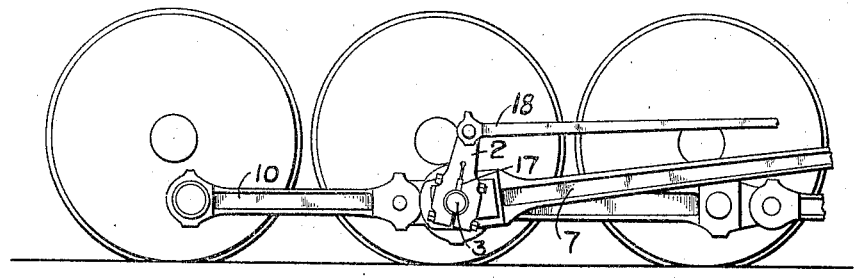
-FIG.1.-
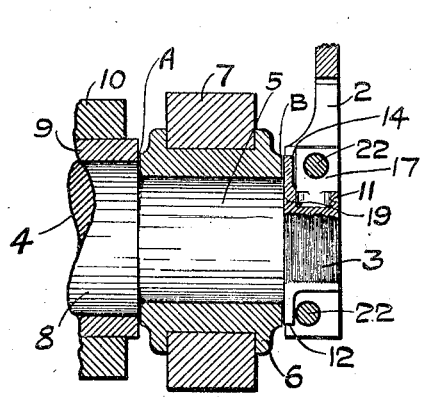
-FIG.3.-
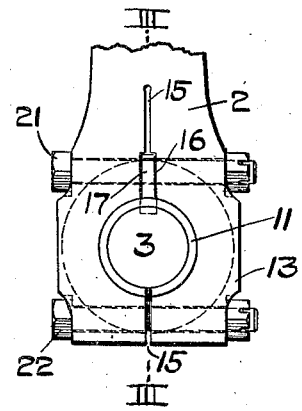
-FIG.2.-
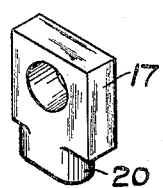
-FIG.5.-
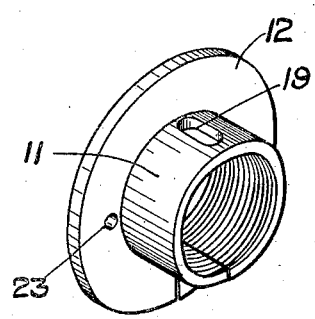
-FIG.4.-
INVENTOR
Harry Swoyer
BY
Clarence Kerr
ATTORNEY Patented Aug. 17, 1926.

1,596,635

UNITED STATES PATENT OFFICE.

HARRY SWOYER, OF DUNKIRK, NEW YORK.

ECCENTRIC-CRANK FASTENING FOR LOCOMOTIVES.

Application filed November 13, 1925. Serial No. 68,787.

Fig. 1 is a partial side elevation of a locomotive engine showing the application of my invention to a crank pin thereof; Fig. 2 is a partial elevation on an enlarged scale of the eccentric crank; Fig. 3 is a section on line III—III of Fig. 2; and Figs. 4 and 5 are enlarged perspectives, respectively, of the collar and collar key.

My invention relates to return cranks used to actuate the eccentric rods of locomotives by which the steam distribution valve mechanism is operated, and has for its object an improved construction in which the eccentric crank is attached to the main crank pin in a manner to resist all the shocks incident to its use and to remain securely fastened thereto under all conditions of service.

Existing methods of attaching eccentric cranks to main crank pins frequently permit the crank to shift from its proper position, thus disturbing the timing of the valve events which results in uneconomical operation, excessive wear and tear on the machinery and costly repairs. As the eccentric crank is affixed on a main crank pin extension of reduced diameter, at the outside of the main rod connection, it must act as a guide for the outside face of the main rod bearing, and since these bearings must be fitted with some lateral clearance, the eccentric crank attachment, in addition to its regular functions, has to withstand the shock of the lateral thrust of the main rod, augmented by the lateral thrust of the coupling rods which are positioned upon the inside of the main rod.

In carrying out my invention I provide a construction in which the lateral shock of the rods is absorbed by means applied on the reduced end of the crank pin, and the eccentric crank is attached to the crank pin in such manner that the entire connection thus formed is one which will remain tight under all service requirements. It is, moreover, a construction permitting the easy removal and replacement of the eccentric crank. My invention also comprises various features which I shall hereinafter describe and claim.

Referring to the drawings, the eccentric crank 2 is fitted and secured to the reduced end 3 of the main crank pin 4, which extends outside of the crank bearing surface 5 for the bearing 6 of the main rod 7. Inside the surface 5 on the pin 4 is a surface 8 for the bearing 9 of the side rod 10. The surface 5 is wider than the bearing 6, so as to allow for a slight amount of lateral clearance at A and B on either side of the bearing 6, and since in service this clearance is increased from wear and thus permits an outward lateral thrust, I have made provision to relieve the eccentric crank from the pounding resulting from such thrust by the construction now to be described.

The crank pin extension or reduced end 3 is threaded for a split screw collar 11, which has at its inner end a flange 12 of approximately the same diameter as the outer face of the bearing 6, and when the collar 11 has been applied to the extension 3 the flange 12 forms a full surface bearing to resist the outward thrust of the rods 7 and 10.

The hub end 13 of the crank 2 slips over the outside of the collar 11, and is counterbored at 14 on its inside face for the flange 12, but the depth of the counterbore is somewhat less than the thickness of the collar in order to prevent any contact with the outer face of the main rod bearing 6. The hub end 13 of the crank is split on its center line at 15 and the split is widened at 16 to accommodate the key 17, which has a body preferably of rectangular form. The angular position of the eccentric crank is determined when setting the valves so that the crank pin extension 3 may actuate the eccentric rod 18 with the correct amount of travel, and when definitely located a keyway 19 is cut through the wall of the collar 11 and down into the extension 3. While the upper or body portion of the key 17 is rectangular in form, its lower portion 20, which seats snugly in the keyway 19, in the collar 11 and extension 3, is preferably reduced in cross section and oval in shape. The rectangular portion of the key 17 has its outer face flush with the outer face of the crank, and is of sufficient size to form a substantial bearing for the upper clamping bolt 21. The crank is apertured on opposite sides of the crank pin for the clamping bolts 21 and 22, which fit loosely in such apertures.

In assembling the crank fastening, the collar 11 is first screwed on the crank pin extension 3 by a spanner wrench engaging holes 23, until the flange 12 engages the shoulder formed by the reduced end 3. When the proper position for the keyway 19 has been determined, it is cut through the collar 11 and into the extension 3, and the key is placed therein. The eccentric crank 2 is next applied and then the clamping bolts 21 and 22 are inserted. The upper bolt 21 is preferably tightened first, after which the lower bolt 22 is tightened. As the crank is split this tightening action will clamp the crank to the collar 11 and the collar to the threaded portion of the extension 3. Some clamping action is also exerted on the collar flange 12, as this is also split.

It will be seen that with this construction, even if the crank 2 should become loose it can not come off, for the reason that the anchorage of the key 17 in the keyway 19 prevents the dislodgment of the key and that as the bolt 21 extends through the key, the bolt will retain the crank in position.

The terms and expressions which I have employed are used as terms of description and not of limitation, and I have no intention, in the use of such terms and expressions, of excluding any mechanical equivalents of the features shown and described, or portions thereof, but recognize that various structural modifications are possible within the scope of the invention claimed.

What I claim is:

1. In eccentric cranks for locomotive engines, the combination of a crank pin having a reduced end; a flanged collar secured upon such end; a split crank seating upon said collar; bolts for clamping the crank upon the collar; and means for preventing detachment of the crank from the collar.

2. In eccentric cranks for locomotive engines, the combination of a crank pin having a bearing surface thereon for a main rod; a reduced end on the pin outside of said surface; a flanged collar secured upon said end; the flange being disposed to take up the outward thrust of the main rod; and an eccentric crank seated upon the collar and relieved from driving rod thrust by said collar.

3. In eccentric cranks for locomotive engines, the combination of a crank pin having a bearing surface thereon for a main rod; a threaded reduced end on the pin outside of said surface; a flanged collar screwed upon said end, the flange being disposed to take up the outward thrust of the main rod; and an eccentric crank seated upon the collar and relieved from driving rod thrust by said collar.

4. In eccentric cranks for locomotive engines, the combination of a crank pin having a bearing surface thereon for a main rod; a reduced end on the pin outside of said surface; a flanged split collar secured upon said end; a split crank seating upon said collar; a key seating in said collar and crank; and bolting means for clamping said crank upon said collar and the collar upon said end, said bolting means engaging said key whereby detachment of the crank from the collar is prevented.

5. In eccentric cranks for locomotive engines, the combination of a crank pin having a bearing surface thereon for a main rod; a reduced end on the pin outside of said surface; a flanged split collar secured upon said end; a split crank seating upon said collar; a key seating in said collar and crank; and bolts for clamping the crank upon said collar and the collar upon said end, one of said bolts extending through said key whereby detachment of the crank from the collar is prevented.

6. In eccentric cranks for locomotive engines, the combination of a crank pin having a bearing surface thereon for a main rod; a threaded reduced end on the pin outside of said surface; a flanged split collar screwed upon said end; a split crank seating upon said collar; a key seating in said collar and crank; and bolts for clamping the crank upon said collar and the collar upon said end, one of said bolts extending through said key whereby detachment of the crank from the collar is prevented.

7. In eccentric cranks for locomotive engines, the combination of a crank pin having a bearing surface thereon for a main rod; a reduced end on the pin outside of said surface; a flanged split collar secured upon said end; a split crank seating upon said collar; a key seating in a key way in the crank, the collar, and the said end; and bolts for clamping the crank upon said collar and the collar upon said end, one of said bolts extending through said key whereby detachment of the crank from the collar is prevented.

HARRY SWOYER.